United States Patent [19]

Matsuda et al.

[11] Patent Number: 5,368,895
[45] Date of Patent: Nov. 29, 1994

[54] APPARATUS AND METHOD FOR PRODUCING MONOMOLECULAR FILMS OR MONOMOLECULAR BUILT-UP FILMS

[75] Inventors: Hiroshi Matsuda; Haruki Kawada; Yuji Kasanuki; Yoshiharo Yanagisawa; Yuko Morikawa, all of Kanagawa, Japan

[73] Assignee: Canon Kabushiki Kaisha, Tokyo, Japan

[21] Appl. No.: 22,942

[22] Filed: Feb. 26, 1993

[30] Foreign Application Priority Data

Mar. 5, 1992 [JP] Japan .................. 4-048835

[51] Int. Cl.$^5$ .............................................. B05D 1/20
[52] U.S. Cl. ................... 427/430.1; 427/434.2; 427/434.3; 118/402
[58] Field of Search ............. 427/430.1, 434.2, 434.3; 118/402

[56] References Cited

U.S. PATENT DOCUMENTS

| | | | |
|---|---|---|---|
| 4,643,125 | 2/1987 | Barlow et al. | 118/402 |
| 4,645,693 | 2/1987 | Roberts et al. | 427/434.3 |
| 4,646,678 | 3/1987 | Grunfeld | 118/402 |

FOREIGN PATENT DOCUMENTS 2-72666  3/1990  Japan ................. 118/402

OTHER PUBLICATIONS

G. G. Roberts, "Lagmuir–Blodgett Films", Plenum Press, N.Y. 1990, pp. 100–105. (no month date).

*Primary Examiner*—Shrive Beck
*Assistant Examiner*—Katherine A. Bareford
*Attorney, Agent, or Firm*—Fitzpatrick, Cells, Harper & Scinto

[57] ABSTRACT

An apparatus for producing monomolecular films or monomolecular built-up films includes: a trough for accommodating a liquid over the surface of which a monomolecular film is to be spread; a barrier band for defining a region in the trough over which the monomolecular film is allowed to be spread; and a plurality of supports for holding the barrier band within the trough, the supports being arranged at positions where they do not interfere with the surface of the liquid, wherein the loss of the monomolecular film material can be substantially reduced. Further, no local collapse of the molecular film occurs in the vicinity of the supports, thereby making it possible to always provide a uniform LB film.

12 Claims, 6 Drawing Sheets

FIG. I (A) PRIOR ART (COMPRESSION OF MOLECULES)

FIG. I (B) PRIOR ART

FIG. 2(A) PRIOR ART (COMPRESSION OF MOLECULES)

PRIOR ART

FIG. 4(A)

A' (COMPRESSION OF MOLECULES)

APPARATUS AND METHOD FOR PRODUCING MONOMOLECULAR FILMS OR MONOMOLECULAR BUILT-UP FILMS

BACKGROUND OF THE INVENTION

1. Field of the Invention

This invention relates to an apparatus and a method for producing monomolecular films or monomolecular built-up films generally called Langmuir-Blodgett films (hereinafter referred to as "LB films").

2. Description of the Related Art

In an LB film producing apparatus, a monomolecular film spread over a water surface is adjusted to a fixed surface pressure. A clean plate of glass or metal is raised and lowered vertically with respect to the monomolecular film so as to transfer the monomolecular film on the surface of the water, which is under the fixed surface pressure, onto the surface of the plate, thereby forming a monomolecular built-up film. In such an apparatus, a means for two-dimensionally compressing or expanding the monomolecular film on the surface of water is indispensable. Conventionally, the following two methods have been employed for such compressing or expanding (see "Langmuir-Blodgett Films" published by G. G. Roberts, Plenum Press, New York, 1990, pp. 100–105).

Figure 1A:
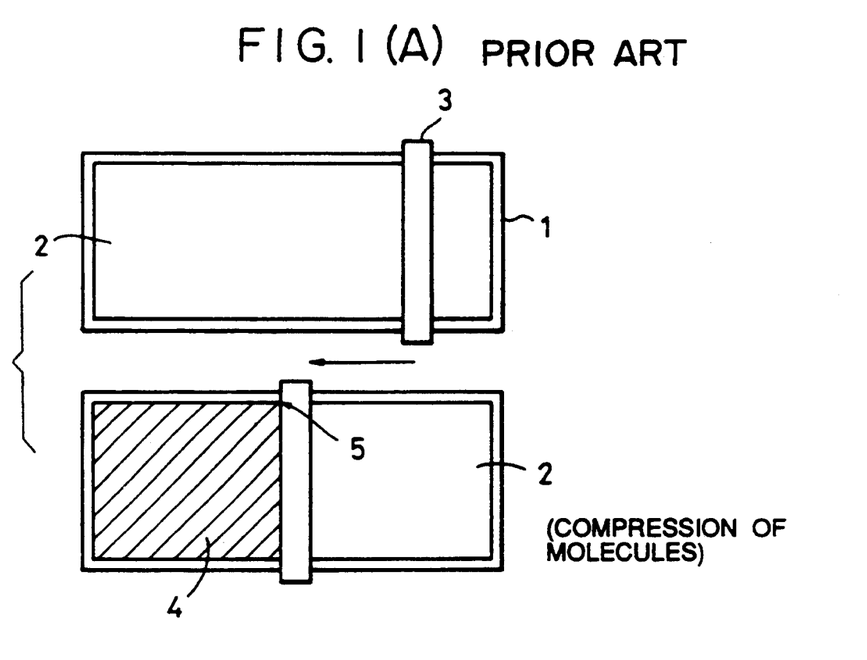
FIG. 1(A) is a schematic top view of a conventional LB film producing apparatus.
Figure 1B:
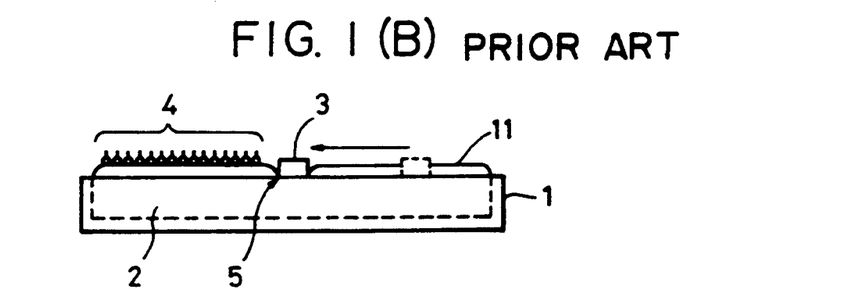
FIG. 1(B) is a side sectional view of the same.

As schematically shown in FIGS. 1A and 1B, according to one of the methods, a trough 1 is filled to the brim with water 2 (hereinafter referred to as "subphase"). The surface 11 of the subphase is divided by one or a plurality of barriers 3, which slide along the brim of the trough, thereby varying the surface pressure of a monomolecular film 4 on the surface of the subphase.

Figure 2A:
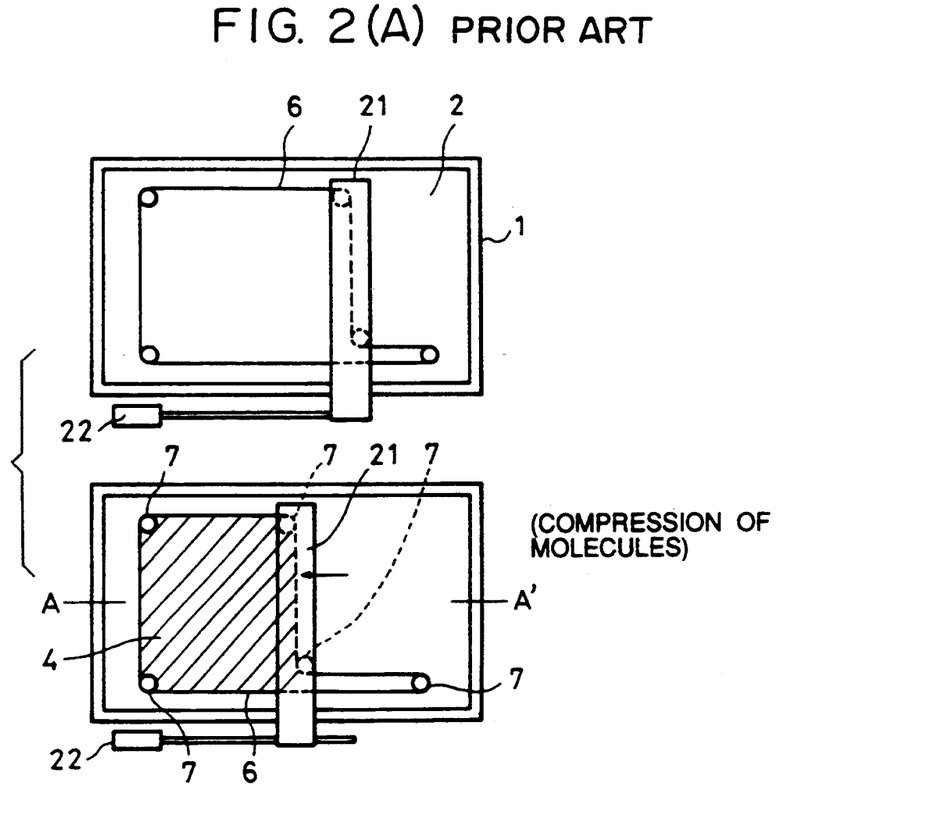
FIG. 2(A) is a schematic top view of another conventional LB film producing apparatus.
Figure 2B:
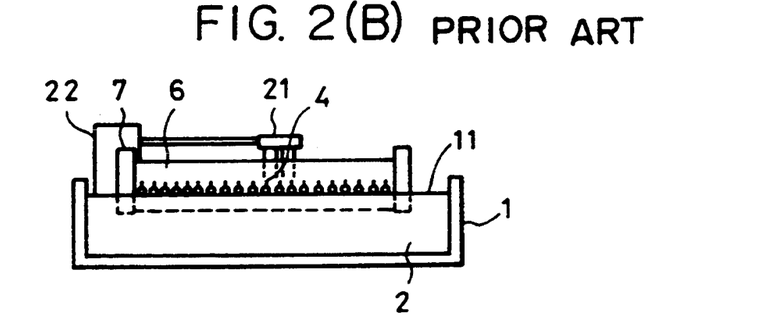
FIG. 2(B) is a side sectional view of the same.

FIGS. 2A and 2B schematically show the other method, according to which some region of the surface 11 of the subphase in the trough 1 is enclosed by a barrier band 6 and, by varying the configuration of the region enclosed by the barrier band, the area of the region is varied, thereby varying the surface tension of a monomolecular film 4 formed in that region.

However, the above-described prior-art techniques have the following problems:

In the first, simplest method, the monomolecular film 4 may escape through the gap 5 between the barrier 3 and the top of the trough when moving the barrier 3 along the top of the trough. Alternatively, due to the variation in surface tension caused by the increase in surface tension, the surface level of the subphase may be changed, thereby causing the molecules forming the monomolecular film to overflow beyond the top of the trough.

Figure 3:
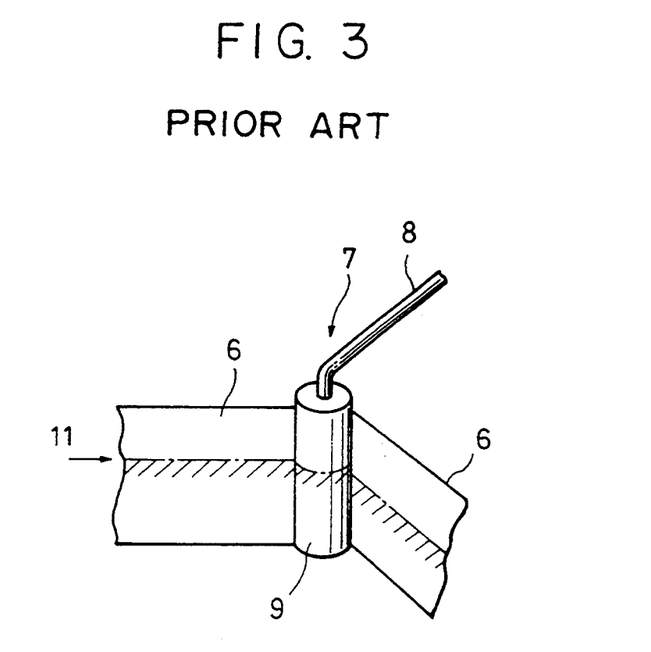
FIG. 3 is an enlarged view of a part of the LB film producing apparatus of FIGS. 2(A) and 2(B), showing the portion thereof around one of its supports.

With the second method, it is possible to substantially reduce the escape to the exterior of the trough of the molecules forming the monomolecular film. In this method, a plurality of supports 7 are provided within the trough 1, as shown in FIGS. 2A, 2B and 3, for the purpose of keeping the barrier band 6 in a fixed configuration or precisely changing the area of the region enclosed by the barrier band 6. By varying the positions of some of the supports 7, it is possible to vary the area of the region enclosed by the barrier band 6, thereby varying the surface pressure of the monomolecular film 4 existing within the enclosed region. The positions of the supports 7 can be changed, for example, by attaching them to appropriate support arms 8 attached to a moveable arm 21 that is capable of making an in-plane movement parallel to the surface of the subphase. The movement of the moveable arm 21 is effected by a horizontal movement mechanism 22 utilizing a stepping motor or a DC motor. In this process, however, the barrier band 6 is caused to slide on the supports 7, with the result that part of the monomolecular film 4 is collapsed in the vicinity of the supports 7. The LB film which has been formed includes portions collapsed in this way, resulting in a deterioration in the quality of the LB film when completed.

FIG. 3 is an enlarged view showing the portion around one of the supports 7. As shown in FIG. 3, this arrangement allows part of the film material to get into the gap between the barrier band 6 and the support 7. Thus, this method has another problem in that it requires a great deal of time and labor to completely remove the film material from the barrier band when cleaning the apparatus.

SUMMARY OF THE INVENTION

It is the object of this invention to provide an apparatus and method in which the above problems have been eliminated and which make it possible to form a monomolecular film or a monomolecular built-up film which is uniform and free from defects.

The above objects are achieved, in accordance with a first aspect of this invention, by an apparatus for producing monomolecular films or monomolecular built-up films, comprising: a trough for accommodating a liquid capable of forming a monomolecular film on the surface thereof; a barrier band for defining a region in the trough over which the monomolecular film forms; and a plurality of supports for holding the barrier band within the trough, said supports arranged at positions to avoid interference with the surface of the liquid.

In a second aspect of this invention there is provided a method of producing monomolecular films or monomolecular built-up films comprising: (a) forming a monomolecular film on a liquid surface by spreading a monomolecular film-forming material on a surface of a liquid in a defined region of a trough by moving a barrier band supported by a plurality of supports wherein the supports are arranged at positions to avoid interference with the surface of the liquid within the trough; and (b) transferring the monomolecular film on the surface of the liquid onto a substrate. The process is repeated as necessary to form a monomolecular built-up film.

In a third aspect of the invention there is provided a method for producing monomolecular films or monomolecular built-up films comprising: (a) forming a monomolecular film on a liquid surface by spreading a monomolecular film-forming material on a surface of a liquid in a defined region of a trough by moving a barrier band supported by a plurality of supports wherein the supports are arranged at positions to avoid interference with the surface of the liquid, within the trough; and (b) transferring a portion of the monomolecular film on the surface of said liquid onto a substrate. The process is repeated as necessary to form a monomolecular built-up films.

DESCRIPTION OF THE PREFERRED EMBODIMENTS

First Embodiment

The present invention will now be described in detail with reference to the drawings.

Figure 4A:
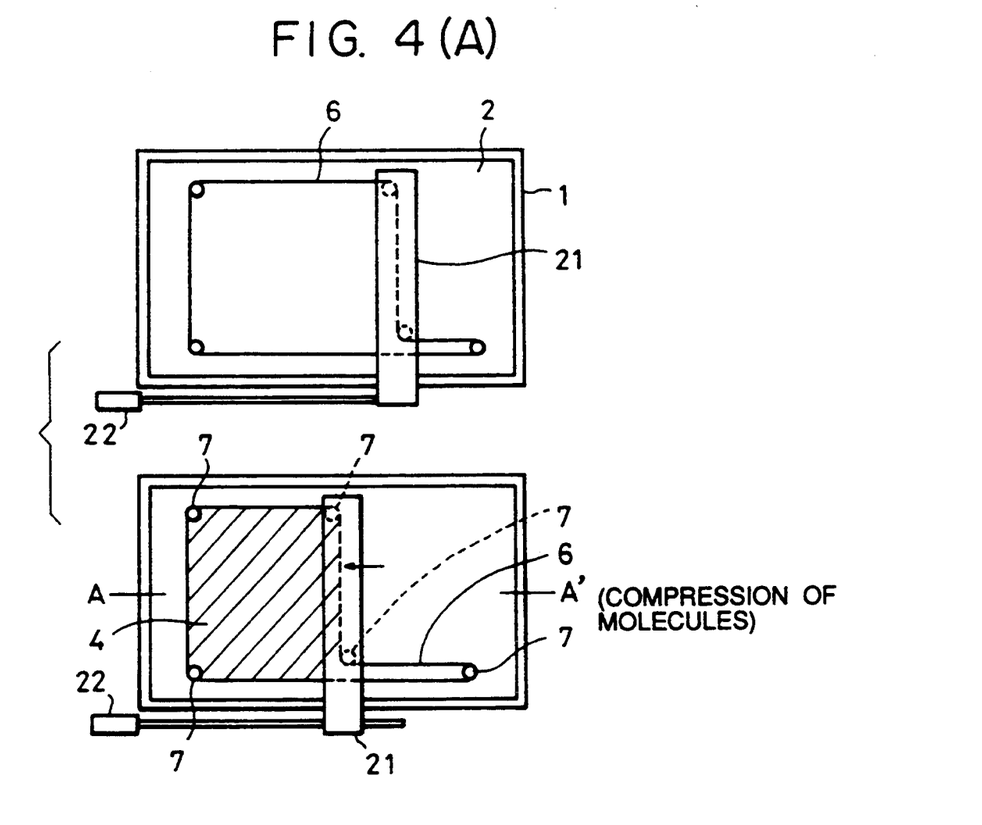
FIG. 4(A) is a schematic top view of an LB film producing apparatus according to an embodiment of this invention.
Figure 4B:
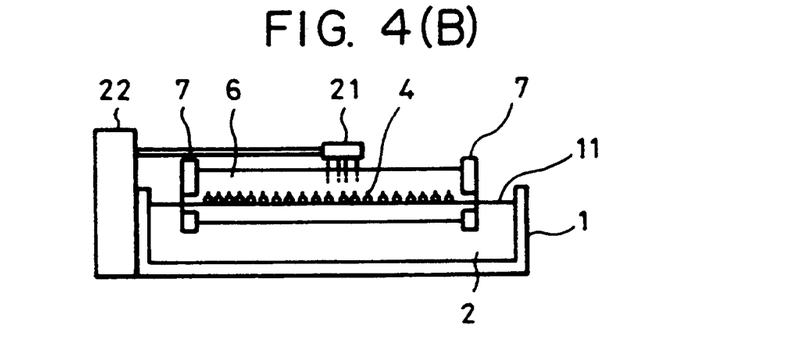
FIG. 4(B) is a side sectional view of the same.

FIG. 4(A) is a schematic top view of an LB film producing apparatus according to an embodiment of this invention, and FIG. 4(B) is a side sectional view of the same. As shown in the drawing, the LB film producing apparatus of this invention comprises a trough 1 for accommodating a subphase 2, a barrier band 6 for enclosing an appropriate region of the surface 11 of the subphase, and supports 7 for holding the barrier band 6. In the apparatus of this invention, a monomolecular film 4 is formed in a region of the surface 11 of the subphase which is enclosed by the barrier band 6. Any means may be employed to vary the region enclosed by the barrier band 6. For example, a moveable arm 21 and a horizontal movement mechanism 22 as described above can be employed for this purpose.

Figure 5:
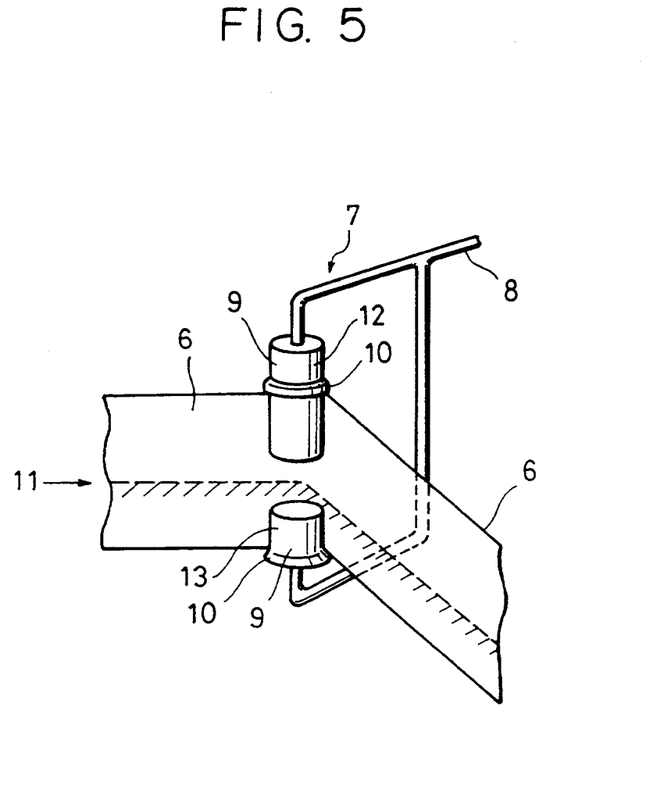
FIG. 5 is an enlarged view of a part of the LB film producing apparatus according to an embodiment of this invention, schematically showing the portion thereof around one of its supports.

FIG. 5 is a schematic diagram illustrating the structure of the supports 7 of the apparatus of the present invention. The supports 7 may be constructed in any fashion as long as they satisfy the above conditions. The construction shown in FIG. 5 is one which is especially preferable. As shown in the drawing, each support 7 comprises a column 9 for supporting the barrier band 6, a support arm 8 for holding the column 9, and flanges 10 for vertically stopping the barrier band 6 so as to prevent it from being offset in the longitudinal direction of the column 9. The column 9 is separated into upper section 12 and lower section 13, with the surface 11 of the subphase located therebetween. A preferable distance between the upper section 12 and lower section 13 of the column ranges from 0.5 to 2 cm. To enable the column 9 to be held in the proper position or brought thereto, the support arm 8 is held by the moveable arm 21, which is driven by the horizontal movement mechanism 22 as shown in FIGS. 4A and 4B. It goes without saying that the supports 7 should be set in such a way that the surface of the subphase is positioned between upper section 12 and lower section 13 of the columns.

The subphase employed to the apparatus of this invention may consist of pure water. Alternatively, it may also consist of, for example, an aqueous solution containing ions of calcium, cadmium, manganese, lithium, barium or the like.

There are no particular restrictions regarding the material forming the monomolecular film. An arbitrary material can be employed to produce the monomolecular film.

Typical monomolecular film-forming materials include: methyl phthalocyanine dyes, such as copper, nickel or lead phthalocyanine; triphenylmethane dyes; diacetylene derivatives; polyimide precursors (or polyimide acids); long chain, alkyl-substituted merocyanine dyes; azulene-type dyes having a squarilium or croconic methine group as a bonding chain attached to a cyanine dye such as quinoline, benzothiazole or benzoxazole; pyrenes substituted with a long chain alkyl carbonic acid; anthracene derivatives; disazo dyes; tetrathiofulvene; metal complexes, including ferrocene and tris-bipyridine ruthenium complexes; fatty acids and their salts; polypeptides, as bacteriorhodopsin or cytochrome C and synthetic polypeptides, as PBLG.

The trough may be one as used in a conventional LB film producing apparatus including rectangular or circular troughs having wells, if desired, to facilitate LB film deposition, and there are no particular restrictions regarding its material, configuration, size, etc.

The barrier band is able to be moved and fixed by the supports, so that its adhesiveness with respect to the supports is of importance. It must exhibit flexibility and firmness, at least in those sections thereof which come into contact with the supports. Thus, it is desirable that the material of the barrier band be polytetrafluoroethylene (Teflon)-coated glass fibers or the like. For that section of the barrier band which does not come into contact with the supports, a material not satisfying the above conditions, for example, a hard material like plates, may be employed. Further, it is also possible for the barrier band itself to be elastic.

It is necessary that the barrier band should exhibit a closed configuration during the production of an LB film. As to the size of the barrier band, there are no particular restrictions as long as the band is able to intersect the surface of the subphase at some position of the barrier band which does not include those sections thereof coming into contact with the supports. The length of the barrier band is fittingly determined depending on the size of the trough.

Regarding the material for the supports, stainless steel, Teflon, polypropylene, etc. are especially preferable since they help to restrain to a minimum the diffusion of impurities into the subphase. The support arms, columns and flanges of the supports may be formed of the same material or different materials.

There are no particular restrictions regarding the configuration of the supports as long as they can hold the barrier band. For example, they may be cylindrical or prism-like in configuration. However, from the viewpoint of reducing the friction between the barrier band and the supports during the sliding movement, the use of the cylindrical configuration is desirable. Such friction may give rise to vibrations adversely affecting the construction of the monomolecular film 4 on the surface of the subphase. As for the size of the supports, it is desirable that they each have a diameter of 0.5 to 1.5 cm (in the case of the cylindrical configuration) and a height of 1 to 3 cm. The upper and lower flanges of each support are arranged at appropriate positions in such a way that the distance between them is larger than the width of the barrier band. Their height preferably ranges from 1 to 3 mm.

An LB film was experimentally produced by using the above-described LB film producing apparatus. The apparatus used had support arms 8 of stainless steel on which were provided Teflon columns having a diameter of 1 cm and a height of 2 cm. Further, as described above, each column had flanges having a height of 1 mm.

The film material used was 22-tricosanoic acid, which was dissolved in chloroform to prepare a solution having a concentration of approximately 1 mg/ml. Then, pure water at a temperature of 20° C. was prepared as the subphase. The above solution was spread gently over the surface of the subphase, which was enclosed by the above barrier band, thereby forming a monomolecular film 4 of 22-tricosanoic acid on the surface of the subphase.

Next, the region enclosed by the barrier band 6 was slowly compressed to raise the surface pressure of the monomolecular film up to 30 mN/m. The area of the monomolecular film on the surface of the subphase at this time was 850 cm$^2$.

The surface of a silicon wafer substrate was processed with hydrofluoric acid to remove the native oxide layer therefrom. This substrate was held perpendicular with respect to the above monomolecular film and, while maintaining the above surface pressure, immersed in the subphase at a speed of 10 cm/min, thereby transferring the monomolecular layer onto the substrate.

Subsequently, the substrate was withdrawn at a speed of 10 cm/min while maintaining the above surface pressure, thereby stacking another monomolecular layer on the substrate.

By repeating the above immersing and withdrawing procedure, a 22-tricosanoic-acid LB film having 70 layers was obtained. The area of the monomolecular film on the surface of the subphase after the deposition was 55 cm$^2$.

On examination with a polarizing microscope, no adhesion of locally collapsed film portions was to be observed on the LB film obtained. Thus, a uniform film deposition was confirmed.

Second Embodiment

Figure 6:
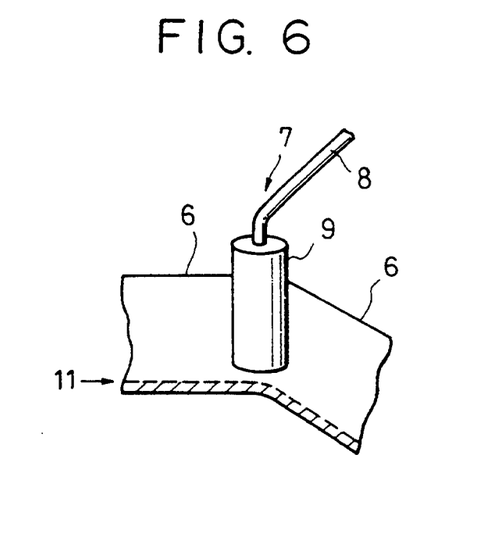
FIG. 6 is an enlarged view of a part of the LB film producing apparatus according to another embodiment of this invention, schematically showing the portion thereof around one of its supports.

In an LB film producing apparatus as shown in FIGS. 4(A) and 4(B), the supports were constructed as shown in FIG. 6, which is an enlarged view of the portion around one of the supports. As shown in the drawing, the barrier band 6 is stretched along the columns 9 and intersects the surface 11 of the subphase. The surface 11 of the subphase is located below the columns 9 and spaced away therefrom.

The materials of the supports and the barrier band were the same as those used in the First Embodiment. The columns, however, had a diameter of 1 cm and a height of 3 cm.

An LB film of 22-tricosanoic acid having 70 layers was produced in the same way as in the First Embodiment except for the change in the form of the supports. No adhesion of collapsed film portions was to be observed on the film.

Third Embodiment

Figure 7:
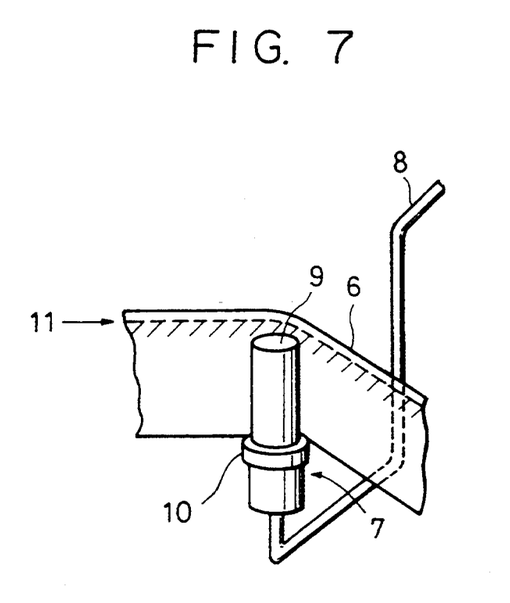
FIG. 7 is an enlarged view of a part of the LB film producing apparatus according to still another embodiment of this invention, schematically showing the portion thereof around one of its supports.

In an LB film producing apparatus as shown in FIGS. 4(A) and 4(B), the supports were constructed as shown in FIG. 7, which is an enlarged view of the portion around one of the supports. As shown in the drawing, the barrier band 6 is stretched along the columns 9 and intersects the surface 11 of the subphase. The columns 9 are in the subphase but are spaced away from the surface 11 of the subphase. Further, to prevent the barrier band 6 from being offset in the longitudinal direction of the columns 9, a flange 10 is provided on each of the columns.

The materials of the supports and the barrier band were the same as those used in the First Embodiment. The width of the barrier band preferably ranges from 2 to 2.5 cm. The supports were formed as cylinders having a diameter of 1 cm and a height of 2.5 cm. The flange, provided on each column at a position 1.2 cm from the bottom, had a width of 1 mm and a height of 2 mm.

An LB film of 22-tricosanoic acid having 70 layers was produced in the same way as in the First Embodiment except for the change in the form of the supports. No adhesion of collapsed film portions was to be observed on the film.

Comparative Example

LB films of 22-tricosanoic acid having 70 layers were produced in the same way as in the First Embodiment, using an LB film producing apparatus as shown in FIGS. 4(A) and 4(B), except that the supports had a conventional structure as shown in FIG. 3. No adhesion of collapsed film portions was to be observed on those LB films having less than 40 layers. However, the LB films having 40 layers or more indicated adhesion of collapsed film portions.

Although the present invention has been described with reference to typical examples thereof, the LB film producing apparatus of this invention is not restricted to the above-described embodiments.

In accordance with this invention, the loss of the monomolecular film material can be substantially reduced. Further, since the supports of the LB film producing apparatus do not come into contact with the region of the subphase surface where the monomolecular film exists, no local collapse of the molecular film occurs in the vicinity of the supports, thereby making it possible to always provide a uniform LB film. In addition, the film material is prevented from getting into gaps between the columns and the barrier band, so that the cleaning of the apparatus is facilitated, thereby attaining an improvement in terms of operational efficiency and productivity.

While the invention has been described and illustrated above in certain preferred embodiments, it will be appreciated that other modifications to the invention within the spirit and scope of the present invention, can be made. Such changes will be obvious to those of ordinary skill in this art. The invention, accordingly, is not to be limited except as set forth in the following claims.

What is claimed is:

1. A method of producing monomolecular films or monomolecular built-up films comprising:
   (a) forming a monomolecular film by spreading a monomolecular film-forming material on a surface of a liquid in a defined region of a trough by moving a single endless belt supported by a plurality of supports to vary a configuration of said defined region in order to change a surface pressure of said monomolecular film-forming material, wherein said supports are adapted to move said single endless belt to vary said configuration and are arranged at positions to avoid interference with the surface of the liquid within the trough; and (b) transferring a portion of the monomolecular film on the surface of said liquid onto a substrate.

2. A method according to claim 1, comprising the step of two-dimensionally compressing or expanding the monomolecular film by varying the configuration of said region.

3. A method according to claim 1, comprising repeating steps (a) and (b) in order to form a monomolecular built-up film.

4. A method of producing monomolecular films or monomolecular built-up films comprising:
  (a) forming a monomolecular film by spreading a monomolecular film-forming material on a surface of a liquid in a defined region of a trough by moving a single endless belt supported by a plurality of supports to vary a configuration of said defined region in order to change a surface pressure of said monomolecular film-forming material, wherein said supports are adapted to move said single endless belt to vary said configuration and are arranged at positions to avoid interference with the surface of the liquid within the trough; and
  (b) transferring the monomolecular film on the surface of said liquid onto a substrate.

5. A method according to claim 4, comprising repeating steps (a) and (b) in order to form a monomolecular built-up film.

6. An apparatus for producing monomolecular films or monomolecular built-up films, comprising:
  a trough for accommodating a liquid capable of forming a monomolecular film on a surface thereof; a single endless belt for defining a region in the trough over which the monomolecular film forms and a plurality of supports for holding the single endless belt within the trough, said supports arranged at positions to avoid interference with the surface of the liquid and adapted to move said single endless belt to vary the region over which the monomolecular film forms.

7. An apparatus according to claim 6, wherein said endless belt is stretched around said supports.

8. An apparatus according to claim 6, wherein said supports are rollers.

9. An apparatus according to claim 6, further comprising a horizontal movement mechanism for said supports.

10. An apparatus for producing monomolecular films or monomolecular built-up films, comprising:
  a trough for accommodating a liquid capable of forming a monomolecular film on a surface thereof; a single endless belt for defining a region in the trough over which the monomolecular film forms and a plurality of supports for holding the single endless belt within the trough, said supports arranged at positions to avoid interference with the surface of the liquid and each of said supports being separated in an axial direction into two cylinders.

11. The apparatus according to claim 10, wherein said cylinders are joined to a support arm.

12. The apparatus according to claim 10, wherein said cylinders are spaced away from the surface of the liquid and located above and below the surface of the liquid.

* * * * *

UNITED STATES PATENT AND TRADEMARK OFFICE
CERTIFICATE OF CORRECTION

PATENT NO. : 5,368,895

DATED : November 29, 1994

INVENTORS : HIROSHI MATSUDA, ET AL.

It is certified that error appears in the above-identified patent and that said Letters Patent is hereby corrected as shown below:

ON THE TITLE PAGE:

AT [56] REFERENCES CITED

"Lagmuir-Blodgett" should read --Langmuir-Blodgett--.
"Fitzpatrick, Cells, Harper & Scinto" should read
--Fitzpatrick, Cella, Harper & Scinto--.

AT [75] INVENTORS

"Yoshiharo Yanagisawa" should read
--Yoshihiro Yanagisawa--.

UNITED STATES PATENT AND TRADEMARK OFFICE
CERTIFICATE OF CORRECTION

PATENT NO. : 5,368,895

DATED : November 29, 1994

INVENTORS : HIROSHI MATSUDA, ET AL.

It is certified that error appears in the above-identified patent and that said Letters Patent is hereby corrected as shown below:

COLUMN 2

Line 58, delete "a".

COLUMN 4

Line 7, "triphenylmethane" should read --triphenyl methane--.

Signed and Sealed this

Fifteenth Day of August, 1995

Attest:

BRUCE LEHMAN

*Attesting Officer*  *Commissioner of Patents and Trademarks*